US008194763B2

(12) United States Patent
Champion (10) Patent No.: US 8,194,763 B2
(45) Date of Patent: Jun. 5, 2012

(54) METHOD FOR DECODING 2X2 SPATIOTEMPORAL CODES, IN PARTICULAR GOLDEN TYPE CODE

(75) Inventor: David Champion, Paris (FR)

(73) Assignee: COMSIS, Paris (FR)

(*) Notice: Subject to any disclaimer, the term of this patent is extended or adjusted under 35 U.S.C. 154(b) by 377 days.

(21) Appl. No.: 12/300,407

(22) PCT Filed: May 11, 2007

(86) PCT No.: PCT/FR2007/000798
§ 371 (c)(1),
(2), (4) Date: Jul. 23, 2009

(87) PCT Pub. No.: WO2007/132084
PCT Pub. Date: Nov. 22, 2007

(65) Prior Publication Data
US 2010/0034320 A1    Feb. 11, 2010

(30) Foreign Application Priority Data

May 17, 2006    (FR) ...................................... 06 04429

(51) Int. Cl.
*H04L 27/06*    (2006.01)
(52) U.S. Cl. ........ 375/260; 375/267; 375/316; 375/340; 375/343
(58) Field of Classification Search .................. 375/130, 375/233, 240.04–240.07, 261, 262, 268, 375/295, 316, 320, 341, 347, 260, 267; 370/206, 370/320, 342; 455/101, 103, 132
See application file for complete search history.

(56) References Cited

U.S. PATENT DOCUMENTS 7,292,647 B1 *   11/2007   Giannakis et al. ............ 375/295
2007/0217537 A1 *   9/2007   Berenguer et al. ............ 375/267

OTHER PUBLICATIONS

J. C. Belfiore, G. Rekaya and E. Viterbo, "The Golden Code: A 2.times.2 Full-Rate Space-Time Code with Non-Vanishing Determinants," IEEE Trans. Inform. Theory (Apr. 2005).*
Belfiore et al., The Golden Code: A 2 x 2 Full-Rate Space-Time Code With Nonvanishing Determinants, IEEE Transactions on Information Theory, vol. 51, No. 4, Apr. 2005, pp. 1432-1436.
Damen et al., Lattice Code Decoder for Space-Time Codes, IEEE Communications Letters, vol. 4, No. 5, May 2000, pp. 161-163.
Foschini et al., Simplified Processing for High Spectral Efficiency Wireless Communication Employing Multi-Element Arrays, IEEE Journal on Selected Areas in Communications, vol. 17, No. 11, Nov. 1999, pp. 1841-1852.
El Gamal et al., On the Optimality of Incremental Redundancy Last Coding, 2005 International Conference on Wireless Networks, Communications and Mobile Computing, IEEE, Jun. 2005, pp. 1472-1476.
Murugan et al., A Unified Framework for Tree Search Decoding: Rediscovering the Sequential Decoder, IEEE Transactions on Information Theory, vol. 52, No. 3, Mar. 2006, pp. 933-953.

* cited by examiner

*Primary Examiner* — Shuwang Liu
*Assistant Examiner* — Ross Varndell
(74) *Attorney, Agent, or Firm* — Greer, Burns & Crain, Ltd.

(57) ABSTRACT

A method is provided for decoding spatiotemporal codes, in particular Golden type code. The received vector is subjected to a MMSE-GDFE filtering, a constellation re-centering to define a Z-matrix, a permutation to obtain X-shaped matrices, a trellis base reduction and a ZF-DFE algorithm by processing the elements of the Z-matrix layer by layer. Each layer includes both elements of the diagonal or anti-diagonal of the Z-matrix.

10 Claims, 2 Drawing Sheets

METHOD FOR DECODING 2X2 SPATIOTEMPORAL CODES, IN PARTICULAR GOLDEN TYPE CODE

CROSS REFERENCE

The present application claims priority to PCT/FR2007/000798 filed May 11, 2007.

FIELD OF THE INVENTION

The present invention relates to a method for decoding 2×2 space-time codes of a vector Y, in particular of the Golden Code type. The present invention can also be applied to 2×2 space-time codes meeting the following conditions:
  the code has a structure in two layers,
  each layer representing the canonical embedding of a principal ideal of the ring of integers $\alpha Z[i,\theta]$ of a number field $Q[i,\theta]$ of degree 2 with respect to $Q[i]$,
  the canonical embedding matrix being proportional to a unitary matrix.

BACKGROUND

In a general manner, in a wireless communication system, using electromagnetic waves as the physical transmission medium, multiple reflections (multiple paths) due to the different obstacles in the propagation space (propagation in the urban environment or in the "indoor" environment) induce phenomena of fading of the signal, i.e. that over a complete frequency range, it is possible to observe destructive interference. The relative movement of the environment with respect to the transmitter and to the receiver makes these fading phenomena stochastic. These fading channels considerably penalise the performance of conventional digital communication systems. To combat fading phenomena effectively, it is necessary that the receiver has available several replicas containing the information transmitted, replicas which have suffered mutual independent fading. The concept of diversity refers to the creation of these replicas and the order of diversity is defined as the number of "independent" replicas which the receiver has available. To mention some examples of diversity: time diversity (the information is repeated with a time difference greater than the coherence interval in order that there is decorrelation between the replicas), frequency diversity, path diversity in CDMA systems, receive antenna diversity. Since 1996, a new coding method, named Space-time coding, using several transmit and receive antennas, has allowed the use of a new form of diversity: transmit antenna diversity. Space-time coding is not the only technique resorting to several transmit and receive antennas: these techniques are combined under the name MIMO (Multiple Input Multiple Output). Recourse to Space-time coding over several antennas considerably improves the performance (owing to diversity) and information rate (owing to multiplexing) of telecommunications systems in an environment having fading ("fading channel").

From all coherent Space-time codes (i.e. that the receiver has perfect knowledge or at least an estimate of the channel coefficients) using two transmit antennas known at the present time, the one offering the best performance is the Golden Code as described in the document: J. C. Belfiore, G. Rekaya and E. Viterbo, "The Golden Code: A 2×2 Full-Rate Space-Time Code with Non-Vanishing Determinants," IEEE Trans. Inform. Theory (April 2005). The Golden Code is actually a maximum diversity (the transmit diversity is 2) and maximum multiplexing (2 symbols per channel use). Furthermore, it also has the highest coding gains (whatever the constellation used). In addition, it was demonstrated recently that the Golden Code can be used on an "Amplify and Forward Relay Channel" with a relay and an antenna and that it can benefit from diversity of collaboration.

The Golden Code only has excellent performance for Maximum Likelihood decoding. As for a number of space-time codes (linear codes), the Maximum Likelihood decoding of the Golden Code is reduced to the search within a region (the shaping region) of a lattice (of dimension 8 for the Golden Code), a lattice which changes according to the channel coefficients, from the point closest to the point received. In order to do this, algorithms to search for the closest point within a lattice were adapted to the decoding of Space-time codes: the Sphere Decoder and the Schnorr-Euchner enumeration. These algorithms need a highly variable number of iterations and are therefore suited only with difficulty to a hardware implementation operating in real time. Accelerations of these algorithms using pre-processing, in particular basis reductions of the LLL type, have also been studied already.

Given the complexity of decoding at Maximum Likelihood decoding, sub-optimal algorithms for decoding Space-time codes have been developed. Some of these algorithms stem from interference equalization and cancellation: this is the case with the ZF (Zero Forcing), MMSE (Minimum Mean Square Error) and ZF-DFE (Decision Feedback Equalizer) algorithms described in: J. Foschini, G. Golden, R. Valenzuela and P. Wolniansky, "Simplified processing for high spectral efficiency wireless communication employing multi-element arrays", IEEE Journal on Selected Areas Communications, vol. 17, p 1841-1852, November 1999, the V-BLAST decoding algorithm. However, these decoders cannot benefit either from transmit diversity or receive diversity.

Recently, low complexity sub-optimal algorithms have been proposed. They use MMSE or ZF algorithms combined with an LLL basis reduction. Thanks to LLL, these algorithms can use the diversity in its entirety, which is not the case in the absence of this pre-processing. In the document: A. D. Murugan, H. El Gamal, M. O. Damen and G. Caire, "A Unified Framework for Tree Search Decoding: Rediscovering the Sequential Decoder", IEEE Transactions on Information Theory, vol. 52, no. 5, May 2006, proved the interest in using MMSE-GDFE filtering as pre-processing in order be able to perform a decoding in the lattice without considering the "shaping" constraint and to make use reduction algorithms such as LLL. Moreover, a general formalising of searching within a tree was proposed, capable accordingly of describing all the techniques resulting from the decoding within a lattice and introducing sequential decoding techniques.

However, even this latter technique cannot optimise the advantages of the Golden Code.

SUMMARY

A purpose of the present invention is to propose a new decoder benefiting from the diversity of a Golden Code. Another purpose of the invention is to design a real time space-time decoder.

At least one of the aforementioned objectives is achieved with a method for decoding 2×2 space-time codes of a vector Y, in particular of the Golden Code type, characterized in that it comprises the following steps:
  a filtering of the MMSE-GDFE type is carried out in order to obtain a vector $Y^F = RX + W$, where $Y^F$ is the vector Y filtered by means of a filter matrix F ("forward filter"), R a conventional matrix named "backward filter", X the vector transmitted and W the complex noise matrix, a constellation recentring is carried out so that the vector to be determined becomes Z, such that $Z=Y^F-2K_M R\Gamma S_0 = 2K_M R\Gamma S+W$, $K_M$ being the normalization constant for the constellation in question, $\Gamma$ being the Golden Code, and S the vector for the information symbols, a step of permutation of the elements of the matrices Z, R and $\Gamma$ is carried out in order to obtain $\tilde{Z}$, $\tilde{R}$ and $\tilde{\Gamma}$ so that $\tilde{R}^H \tilde{R}$ is a matrix in the form of an X and the complex number "i" is moved from $\Gamma$ to R, and a step of lattice basis reduction is carried out so that $\tilde{Z}=2K_M \tilde{\psi}\tilde{\Gamma}S'+W$ with $\tilde{\psi}=\tilde{R}.\Delta_\alpha(x^1,x^2,x^3,x^4)$ and $S'=\pi_\alpha^{-1}(x^1,x^2,x^3,x^4).S$, $\pi_\alpha(x^1,x^2,x^3,x^4)$ being a basis change matrix, $\pi_\alpha(x^1,x^2,x^3,x^4)$ is the matrix associated with $\Delta_\alpha(x^1, x^2, x^3, x^4)$ which is a matrix in which the determinant module is equal to 1 and defined such that $\Delta_\alpha^H \Delta_\alpha$ is a matrix in the form of an X, the ZF-DFE decoding algorithm is applied, in which among the four elements of $\tilde{Z}$ two layers are identified, each layer comprising the two elements of the diagonal or anti-diagonal of $\tilde{Z}$; the DFE algorithm is applied layer by layer and the ZF algorithm within each of the layers.

DESCRIPTION OF THE SEVERAL VIEWS OF THE DRAWINGS

Further aspects of the present invention will become apparent from the following description which is given by way of example only and with reference to the accompanying drawings in which.

DETAILED DESCRIPTION

The decoding algorithms of the prior art having performances comparable to Maximum Likelihood process the Golden Code decoding as that of any lattice of dimension 8. They do not consider two specific aspects of its structure: its construction in 2 layers and the algebraic structure of each of these two layers. The present invention proposes to carry out a layer by layer decoding (as in the method of a DFE), reducing the problem to one of dimension 2. The decoding within each layer is carried out by a simple ZF technique after an algebraic reduction. Such a technique of decoding by layers has the advantage of handling at each step 2×2 diagonal, or known in advance, matrices. In order to obtain performances close to Maximum Likelihood, a reduction capable of combining the two layers before decoding them one by one is advantageously implemented. Conventional reduction techniques (LLL or Korkhine-Zolotareff, for example) destroy the layered structure. This is why a new form of reduction, christened algebraic reduction, can be used.

According to one advantageous characteristic of the invention, the permutation of $\tilde{Z}$ is as follows:

$$\tilde{Z} = \begin{bmatrix} z_{1,1} \\ z_{2,2} \\ z_{1,2} \\ z_{2,1} \end{bmatrix}$$

with the following convention $$Z = \begin{bmatrix} z_{1,1} \\ z_{2,1} \\ z_{1,2} \\ z_{2,2} \end{bmatrix}.$$

In this permutation, the first layer is constituted by the first and last Z elements. The second layer is constituted by the second and third Z elements.

Advantageously, $\tilde{R}$ is a matrix in X form such that:

$$\tilde{R} = \begin{bmatrix} r^1_{1,1} & 0 & 0 & i \cdot r^1_{1,2} \\ 0 & r^2_{2,2} & r^2_{2,1} & 0 \\ 0 & r^2_{1,2} & r^2_{1,1} & 0 \\ r^1_{2,1} & 0 & 0 & i \cdot r^1_{2,2} \end{bmatrix} \text{ and } \tilde{\Gamma} = \frac{1}{\sqrt{5}}\begin{bmatrix} \alpha & \alpha\theta & 0 & 0 \\ \overline{\alpha} & \overline{\alpha}\overline{\theta} & 0 & 0 \\ 0 & 0 & \alpha & \alpha\theta \\ 0 & 0 & \overline{\alpha} & \overline{\alpha}\overline{\theta} \end{bmatrix},$$

$\alpha$ and $\theta$ being the Golden Code coefficients such that:

$$\theta = \frac{1+\sqrt{5}}{2}, \overline{\theta} = \frac{1-\sqrt{5}}{2},$$

$\alpha=1+i-i.\theta$, $\overline{\alpha}=1+i-i.\tilde{\theta}$

Preferably:

$$\Delta_\alpha(x^1, x^2, x^3, x^4) = \begin{bmatrix} x^1 & 0 & 0 & \frac{\alpha}{\overline{\alpha}}x^4 \\ 0 & \overline{x}^1 & \frac{\overline{\alpha}}{\alpha}x^4 & 0 \\ 0 & \frac{\alpha}{\overline{\alpha}}\overline{x}^2 & \overline{x}^3 & 0 \\ \frac{\overline{\alpha}}{\alpha}x^2 & 0 & 0 & x^3 \end{bmatrix}$$

and $$\Pi_\alpha(x^1, x^2, x^3, x^4) = \begin{bmatrix} x^1_1 & x^1_2 & x^4_1 & x^4_1 - x^4_2 \\ x^1_2 & x^1_1+x^1_2 & x^4_2 & -x^4_1 \\ x^2_1+x^2_2 & x^2_1+2\cdot x^2_2 & x^3_1+x^3_2 & -x^3_2 \\ -x^2_2 & -x^2_1-x^2_2 & -x^3_2 & x^3_1 \end{bmatrix}$$

where $\forall j\ 1\leq j\leq 4\ x^j=x_1^j+\theta.x_2^j$ ($x_1^j$ et $x_2^j \in Z[i]$).

According to one advantageous embodiment of the invention, $\Delta_\alpha$ is determined such that during a QR decomposition, both elements of a single layer are substantially of the same value. This accordingly defines a first equilibrium criterion within each layer.

According to yet another advantageous embodiment of the invention, $\tilde{Z}$ being defined as two layers, a first layer composed of elements on the diagonal and a second layer composed of elements on the anti-diagonal, $\Delta_\alpha$ is determined such that, during a QR decomposition, the product of the two elements of the second layer is greater than the product of the two elements of the first layer. This accordingly defines a second criterion for maximizing the power of the second layer.

Moreover, during application of the ZF algorithm for the second layer, it is preferable to extract p possible candidates and then, during application of the ZF algorithm for the first layer, p possible candidates are also extracted and then the best candidate vector is determined on completion of the overall ZF-DFE algorithm. Advantageously, p is equal to 2.

The present invention is applied advantageously if $\tilde{R}$ and $\Delta_\alpha$ are X or diamond matrices.

Figure 1:
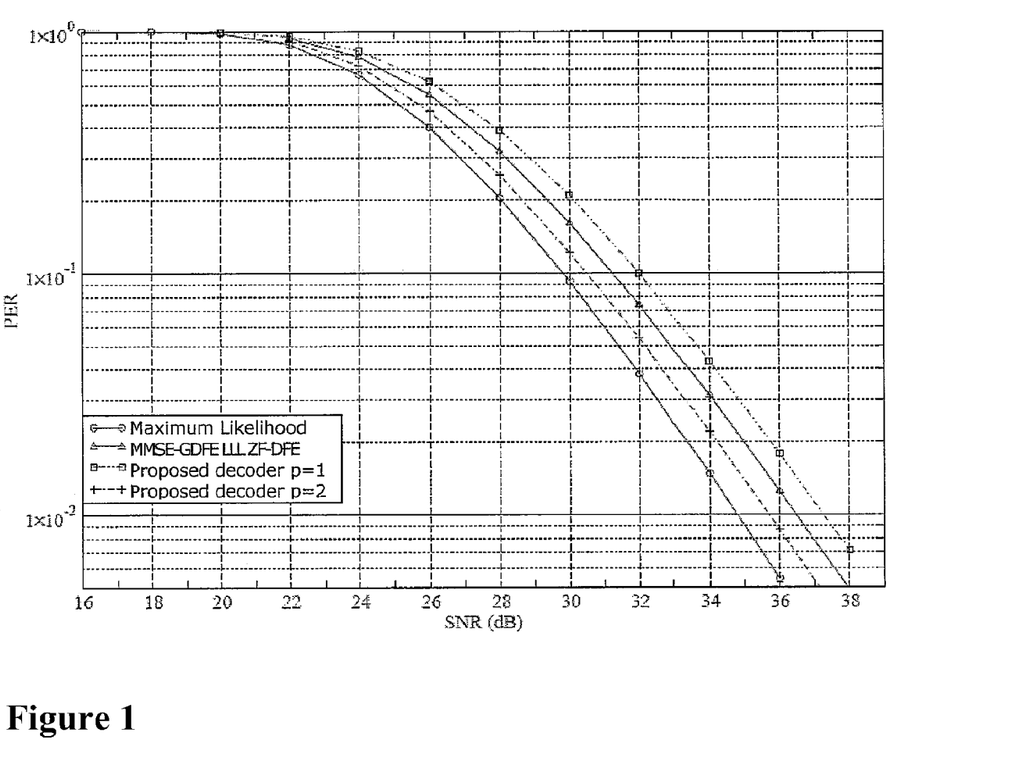
FIG. 1 is a performance curve for a decoder according to the invention compared with a decoder of the prior art and a Maximum Likelihood decoder.
Figure 2:
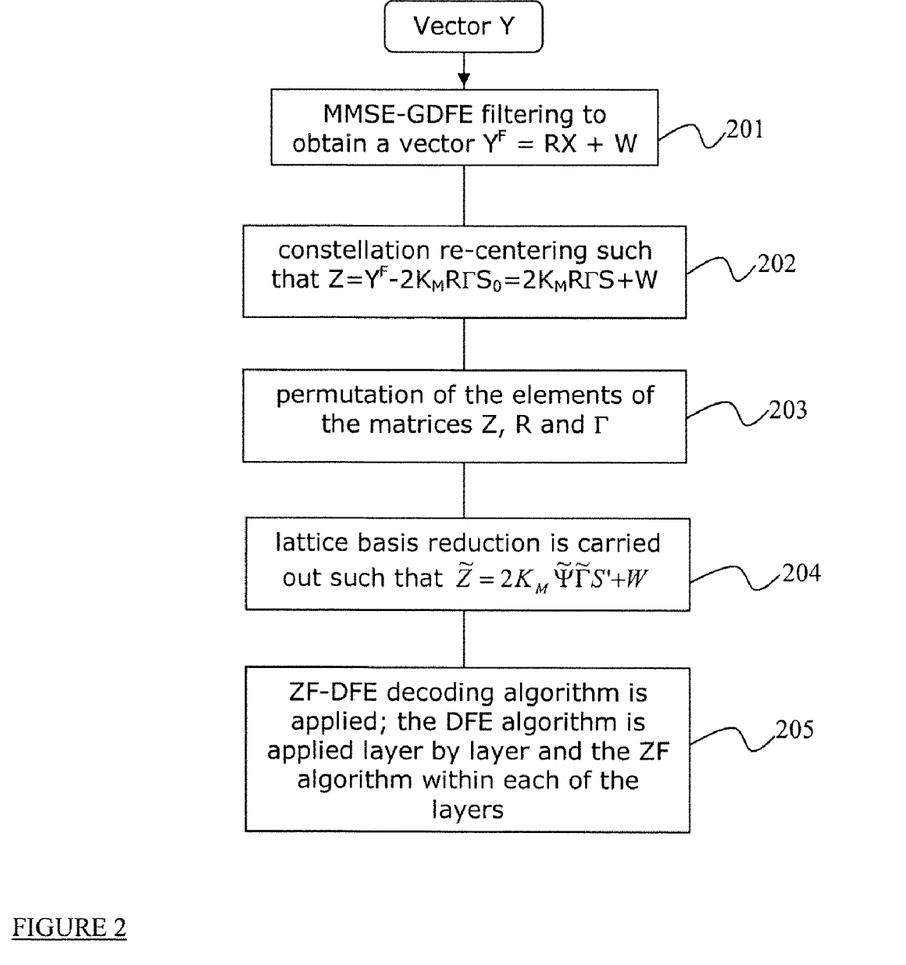
FIG. 2 is a flow chart of steps according to the invention.

Other advantages and characteristics of the invention will become apparent on examination of the detailed description of an embodiment which is in no way limitative, and the attached figures. FIG. 1 is a performance curve for a decoder according to the invention compared with a decoder of the prior art and a Maximum Likelihood decoder. FIG. 2 is a flow chart of steps according to the invention.

For the description which follows, we shall use the following notations and conventions:

All assemblies in bold
Z the ring of relative integers
Q the field of rational numbers
R the field of real numbers
  i is the number defined by $i^2=-1$
  C the field of complex numbers
  Q[i] the field defined by Q[i]={x+i.y with (x,y)∈$Q^2$}
  Z[i] the ring defined by Z[i]={x+i.y with (x, y)∈$Z^2$} (ring of Gauss integers)
  Q[θ] the algebraic extension field of Q generated by [θ]
  Z[θ] the ring of algebraic integers from the number field Q[θ]
  θ is an algebraic integer of degree 2
  Q[i,θ] the algebraic extension field of Q[i] generated by θ. This is an algebraic extension of Q of degree 4.
  Z[i,θ] the ring of algebraic integers of the body of numbers Q[i,θ]
  $\Re(x)$ the real part of a complex number x
  $\Im(x)$ the imaginary part of a complex number x
  x* is the complex conjugate of x
  $GL_n(E)$ all invertible square matrices of dimension n with coefficients in E (where E is a ring) and in which the inverse is also with coefficients in E
  $I_n$ the identity matrix of dimension n
  $X^T$ the transposed matrix of the X matrix
  $X^H$ the conjugated transposed matrix of the X matrix
  $\lfloor x \rfloor$ the largest integer less than or equal to x
  ln (x) the Napierian logarithm of x for x>0
  E(.) the expected value.

The principle of the Golden Code will now be described. For a constellation $M^2$ QAM, the Golden Code (annotated $\Gamma_M$) is the finished set of the 2×2 matrices with complex coefficients defined as follows:

$$\Gamma_M = \left\{ \frac{1}{\sqrt{5}} \begin{bmatrix} \alpha \cdot (a+b\cdot\theta) & \alpha \cdot (c+d\cdot\theta) \\ i\cdot\bar{\alpha}\cdot(c+d\cdot\bar{\theta}) & \bar{\alpha}\cdot(a+b\cdot\bar{\theta}) \end{bmatrix} \text{with } a, b, c, d \in M^2QAM \right\}$$

Where

-continued $$\theta = \frac{1+\sqrt{5}}{2}, \bar{\theta} = \frac{1-\sqrt{5}}{2}, \alpha = 1+i-i\cdot\theta, \bar{\alpha} = 1+i-i\cdot\bar{\theta}$$

and $$M^2QAM = \{K_M((2\cdot k + 1 - M) + i\cdot(2\cdot n + 1 - M))|$$
$$(k, n) \in \{0, \ldots, M-1\}^2\}$$

where $$K_M = \frac{1}{\sqrt{\frac{2\cdot(M^2-1)}{3}}} \text{ is the normalization constant of } M^2QAM.$$

In the MIMO context, the matrix notation is interpreted in the following manner: if a word X from the Golden Code (X∈$\Gamma_M$) is transmitted, this means that:
  $x_{1,1}$ is sent by the antenna i=1 at time t=1.
  $x_{1,2}$ is sent by the antenna i=1 at time t=2.
  $x_{2,1}$ is sent by the antenna i=2 at time t=1.
  $x_{2,2}$ is sent by the antenna i=2 at time t=2.

By considering $\Gamma_M$ in $R^8$ (or $C^4$), the Golden Code can be seen as a portion of a lattice of dimension 8 (or of complex dimension 4) decentred and delineated by a shaping region. To do this, it suffices to rewrite $\Gamma_M$ in the following manner:

$$\Gamma_M = \left\{ \begin{aligned} &\frac{2\cdot K_M}{\sqrt{5}} \begin{bmatrix} \alpha \cdot (s_1+s_2\cdot\theta) & \alpha \cdot (s_3+s_4\cdot\theta) \\ i\cdot\bar{\alpha}\cdot(s_3+s_4\cdot\bar{\theta}) & \bar{\alpha}\cdot(s_1+s_2\cdot\bar{\theta}) \end{bmatrix} + \\ &\frac{K_M\cdot(1+i)\cdot(1-M)}{\sqrt{5}} \begin{bmatrix} \alpha\cdot(1+\theta) & \alpha\cdot(1+\theta) \\ i\cdot\bar{\alpha}(1+\bar{\theta}) & \bar{\alpha}\cdot(1+\bar{\theta}) \end{bmatrix} \\ &avec(s_1, s_2, s_3, s_4) \in Z[i]^4 \cap Q_M^4 \end{aligned} \right\}$$

where $Q_M$=[0;M−1]+i.[0;M−1]

Subsequently, the information symbols vector is annotated $S=(s_1, s_2, s_3, s_4)^T$. It is clear that the determination of the word of the Golden Code is equivalent to the determination of the vector S of $Z[1]^4$ in the shaping region $Q_M^4$.

Advantageously, a Golden Code word consists of two layers:
  the pair ($x_{1,1}$, $x_{2,2}$) forms the layer 1, which depends only on the pair ($s_1$, $s_2$)
  the pair ($x_{1,2}$, $x_{2,1}$) forms the layer 2, which depends only on the pair ($s_3$, $s_4$);

We repeat below the "idealistic" decoding criterion at Maximum Likelihood

Let us consider the case of a receiver having N receive antennas (N≧2). In the case of a MIMO Flat Fading channel (which is optionally different between time 1 and time 2), if we suppose that Golden Code word X was transmitted, the signals $y_{j,t}$ received by the receive antenna j (1≦j≦N) at time t (1≦t≦2) can be written in the form:

$$y_{j,t} = h_{j,1}{}^t x_{1,t} + h_{j,2}{}^t x_{2,t} + b_{j,t} \qquad \text{(Equation 1)}$$

where $h_{j,i}{}^t$ designates the channel coefficient between the transmit antenna i and the receive antenna j at time t and $b_{j,t}$ the complex noise on the receive antenna j at time t. The complex noise is assumed to be symmetric circularly centred Gaussian of variance $N_0$ (the real and imaginary parts have for variance $N_0/2$) and independent according to space (according to j) and the time (according to t), i.e.:

$$E(b_{j,t}b_{j',t'}{}^*) = N_0 \delta_{t,t'} \delta_{j,j'}$$

where $\delta_{t,t'}$ designates the Kronecker symbol between t and t'.

The channel coefficients and the noise variance are assumed to be known by the receiver.

Equation (1) can be rewritten as a matrix:

$$\underbrace{\begin{bmatrix} y_{1,1} \\ \vdots \\ y_{N,1} \\ y_{1,2} \\ \vdots \\ y_{N,2} \end{bmatrix}}_{Y} = \underbrace{\begin{bmatrix} h^1_{1,1} & h^1_{1,2} & 0 & 0 \\ \vdots & \vdots & \vdots & \vdots \\ h^1_{N,1} & h^1_{N,2} & 0 & 0 \\ 0 & 0 & h^2_{1,1} & h^2_{1,2} \\ \vdots & \vdots & \vdots & \vdots \\ 0 & 0 & h^2_{N,1} & h^2_{N,2} \end{bmatrix}}_{H} \cdot \begin{bmatrix} x_{1,1} \\ x_{2,1} \\ x_{1,2} \\ x_{2,2} \end{bmatrix} + \underbrace{\begin{bmatrix} b_{1,1} \\ \vdots \\ b_{N,1} \\ b_{1,2} \\ \vdots \\ b_{N,2} \end{bmatrix}}_{B}$$

Now, given that $X \in \Gamma_M$, there is $S \in Z[i]^4 \cap Q_M^4$ such that:

$$\begin{bmatrix} x_{1,1} \\ x_{2,1} \\ x_{1,2} \\ x_{2,2} \end{bmatrix} = 2 \cdot K_M \underbrace{\frac{1}{\sqrt{5}} \begin{bmatrix} \alpha & \alpha\theta & 0 & 0 \\ 0 & 0 & i\alpha & i\alpha\bar{\theta} \\ 0 & 0 & \alpha & \alpha\theta \\ \bar{\alpha} & \bar{\alpha}\bar{\theta} & 0 & 0 \end{bmatrix}}_{\Gamma} \cdot (S + S_0)$$

with $S_0 = \dfrac{(1+i) \cdot (1-M)}{2} \begin{bmatrix} 1 \\ 1 \\ 1 \\ 1 \end{bmatrix}$ Therefore, we have:

$Y = 2.K_M.H.\Gamma.(S+S_0) + B$

From which:

$Y' = Y - 2.K_M.H.\Gamma.S_0 = 2.K_M.H.\Gamma.S + B$

It is easy to demonstrate that the Maximum Likelihood decoding consists of deciding, knowing Y' and the channel coefficients, that the vector transmitted is the vector $\hat{S}$ defined by:

$$\hat{S} = \text{Arg}\left(\min_{S \in Z[i]^4 \cap Q_M^4} \|Y' - \Lambda \cdot S\|^2\right)$$

with $= 2.K_M.H.\Gamma$

Decoding at Maximum Likelihood consists of finding the point of the lattice of real dimension 8 (complex dimension 4), generated by columns, closest to Y', provided that the coordinates of this point belong to the shaping region ($Q_M^4$). Provided that the matrix is of real rank 8 (or complex rank 4), a decoding at Maximum Likelihood is feasible by the Sphere Decoder algorithm or by the Schnorr-Euchner enumeration algorithm, both duly modified to integrate the "shaping" constraint.

According to the present invention, the first step is the application of a MMSE-GDFE filter, 201 on FIG. 2.

The MMSE-GDFE filtering technique is a pre-processing technique used currently in the Space-Time code decoding field. It has been shown that MMSE-GDFE filtering can overcome the shaping constraint, without degrading performance significantly. Moreover, this filtering can guarantee that the virtual channel matrix is of full rank. By transforming the decoding problem into that of a search within a lattice for the point closest to a point received, the MMSE-GDFE filtering can benefit from lattice basis reduction techniques.

Given that the Golden Code matrix Γ is a unitary matrix, the MMSE-GDFE filtering matrix can be determined exclusively from H and $N_0$ (both assumed to be known by the receiver).

The MMSE-GDFE filter matrix, annotated F ("forward filter"), of the matrix H is the 4×2.N complex matrix defined by:

$F = (R^H)^{-1} H^H$, R is the backward filter, where $$(R^H)^{-1} = \begin{bmatrix} (R_1^H)^{-1} & 0 \\ 0 & (R_2^H)^{-1} \end{bmatrix}$$

with $R_1$ (or $R_2$) a triangular complex matrix greater than 2×2 (in which the diagonal terms are positive real numbers) obtained by the Cholesky decomposition of $H^{1H}H^1 + N_0 I_2$ (resp. $H^{2H}H^2 + N_0 I_2$).

In general, decoding in a lattice after MMSE-GDFE filtering is defined in the following manner.

The received symbols vector Y is multiplied by the matrix F, in order to obtain a complex vector of dimension 4, annotated $Y^F$:

$Y^F = F.Y$

It is easy to demonstrate that we have:

$Y^F = R.X + W$ where W is a complex noise vector of dimension 4, in which each of the components is of variance $N_0$. The components of W are still mutually decorrelated, but are no longer Gaussian.

Therefore, we have, 202 on FIG. 2:

$Z = Y^F - 2.K_M.R.\Gamma.S_0 = 2.K_M.R.\Gamma.S + W = \Lambda^F S + W$ (Equation 2)

with $\Lambda^F = 2.K_M.R.\Gamma$

In this case, given Z and R, the decoding method consists of deciding that the vector transmitted is the vector $\hat{S}$ defined by:

$$\hat{S} = \text{Arg}\left(\min_{S \in Z[i]^4 \cap Q_M^4} \|Z - \Lambda^F \cdot S\|^2\right)$$

This decoding method is not equivalent to that of Maximum Likelihood, but damages performance only slightly while guaranteeing the invertibility of the new generator matrix ($\Lambda^F$). Moreover, that it is not penalizing to disregard the shaping condition. The decoding method then consists of deciding that the vector transmitted is the vector $\hat{S}$ defined by:

$$\hat{S} = \text{Arg}\left(\min_{S \in Z[i]^4} \|Z - \Lambda^F \cdot S\|^2\right)$$

This therefore involves finding the point of the lattice generated by the columns of $\Lambda^F$ closest to Z.

If the coordinates of $\hat{S}$ do not confirm the "shaping" condition, it is possible to decide to delete or to reduce $\hat{S}$ in the shaping region while saturating the coordinates of $\hat{S}$ which do not confirm the shaping condition.

According to the invention, the decoder uses a lattice basis reduction. The general principle of lattice basis reduction is defined in the following manner.

Let $\Lambda_R$ be a square real matrix of dimension n and $Z_R$ a point on $R^n$. Suppose that we are searching for the point of the lattice generated by $\Lambda_R$ closest to $Z_R$, i.e. we are searching for $\hat{S}_R$ in $Z^n$ such that:

$$\hat{S}_R = \text{Arg}\left(\min_{S_R \in Z^n} \|Z_R - \Lambda_R \cdot S_R\|^2\right)$$

If $\pi$ is a square matrix of dimension n with unimodular integer coefficients ($\pi \in GL_n(Z)$), then its inverse $\pi^{-1}$ also has integer coefficients. The matrix $\pi$ is called basis change matrix.

We therefore have:

$$Z_R - \Lambda_R . S_R = Z_R - \Lambda_R . \pi . \pi^{-1} . S_R = Z_R - \Lambda_R' . S_R'$$

with $\Lambda_R' = \Lambda_R . \pi$ and $S_R' = \pi^{-1} . S_R$

Therefore the search for $\hat{S}_R$ is equivalent to the search for $\hat{S}'_R$ defined by:

$$\hat{S}'_R = \text{Arg}\left(\min_{S'_R \in Z^n} \|Z_R - \Lambda'_R \cdot S'_R\|^2\right)$$

$\hat{S}_R$ is obtained from the relationship: $\hat{S}_R = \pi . \hat{S}'_R$

The objective of the basis reduction is obtained from a $_R$ an equivalent generator matrix $_R'$ (which generates the same lattice), which has improved vector orthogonality and length properties in order to facilitate the search for the closest point.

There are different reduction criteria, with which algorithms are associated in order to carry out these reductions. The two principal reduction algorithms are: the LLL algorithm and the KZ algorithm. The LLL algorithm is the more frequently used as it is less complex than the KZ algorithm.

The algorithms for classifying the columns of the matrix are also reduction algorithms.

After MMSE-GDFE filtering, the basis reduction can be used to accelerate the optimal search algorithms such as the Sphere Decoder or the Schnorr-Euchner enumeration. Similarly, all the sub-optimal search algorithms in a tree can be improved using a basis reduction technique.

The general principle of a ZF decoding after MMSE-GDFE filtering and basis reduction is as follows.

After MMSE-GDFE filtering, we have (cf. Equation 2):

$$Z = \Lambda^F . S + W$$

In order to be able to use a reduction technique, it is necessary to work on real matrices and vectors. The conversion of a complex vector (resp. a complex matrix) into a real vector (resp. into a real matrix) is carried out in the following manner:

$$Z_R = \begin{bmatrix} \Re(Z) \\ \Im(Z) \end{bmatrix} \text{ and } \Lambda_R^F = \begin{bmatrix} \Re(\Lambda^F) & -\Im(\Lambda^F) \\ \Im(\Lambda^F) & \Re(\Lambda^F) \end{bmatrix}$$

In the case of the Golden Code, $Z_R$ is a vector of dimension 8 and $\Lambda_R^F$ an 8×8 matrix.

We then have:

$$Z_R = \Lambda_R^F . S_R + W_R$$

After reduction of the generator matrix $\Lambda_R^F$, the reduced matrix is annotated $\Lambda_R^F{}'$ and the basis change matrix $\pi$.

We then have:

$$Z_R = \Lambda_R^F{}' . S_R' + W_R \quad \text{(Equation 3)}$$

The decoded word is defined by $\hat{S}_R = \pi . \hat{S}_R'$ where $\hat{S}_R'$ is obtained by rounding the coordinates of $(\Lambda_R^F{}')^{-1} Z_R$. The term ZF (Zero Forcing) originates from the fact that we multiply the received word $Z_R$ by the inverse of the matrix $\Lambda_R^F{}'$.

The general principle of a ZF-DFE decoding after MMSE-GDFE filtering and basis reduction is as follows.

The ZF-DFE decoding after basis reduction proceeds like ZF decoding up to equation 3. A QR decomposition (or Gram-Shmit orthogonalisation) of the matrix $\Lambda_R^F{}'$ is carried out:

$$\Lambda_R^F{}' = U . T$$

with U a unitary real 8×8 matrix and T a real 8×8 upper triangular matrix (in which the terms on the diagonal are positive). By multiplying $Z_R$ by $U^T$, we obtain:

$$Z_R' = U^T . Z_R = T . S_R' + W_R'$$

with $$E(W_R' W_R'^T) = \frac{N_0}{2} I_8$$

as U is unitary

The decoded word is defined $\hat{S}_R = \pi . \hat{S}_R'$ where $\hat{S}_R'$ is obtained coordinate by coordinate in the following manner:

$$\hat{s}'_{R,8} = \left\lfloor \frac{z'_{R,8}}{t_{8,8}} + 0.5 \right\rfloor$$

For the coordinate 7, we refer the decision made on coordinate 8:

$$\hat{s}'_{R,7} = \left\lfloor \frac{z'_{R,7} - t_{7,8} \hat{s}'_{R,8}}{t_{7,7}} + 0.5 \right\rfloor$$

and so on until:

$$\hat{s}'_{R,1} = \left\lfloor \frac{z'_{R,1} - \sum_{j=2}^{8} t_{1,j} \hat{s}'_{R,j}}{t_{1,1}} + 0.5 \right\rfloor$$

We will now describe the decoding algorithm by layers according to the present invention and, in particular, its impact on the general principle of the algorithms described above.

After MMSE-GDFE filtering, we carry out a permutation of Z, 203 on FIG. 2. by re-ordering the lines of Z. We then define the vector $\tilde{Z}$ in the following manner:

$$\tilde{Z} = \begin{bmatrix} z_{1,1} \\ z_{2,2} \\ z_{1,2} \\ z_{2,1} \end{bmatrix}$$

with the following convention $$Z = \begin{bmatrix} z_{1,1} \\ z_{2,1} \\ z_{1,2} \\ z_{2,2} \end{bmatrix}.$$

From equation (2), it is easy to show that:

$$\tilde{Z} = 2K_M \tilde{R}\tilde{\Gamma} \cdot S + \tilde{W}$$

with $$\tilde{R} = \begin{bmatrix} r_{1,1}^1 & 0 & 0 & i \cdot r_{1,2}^1 \\ 0 & r_{2,2}^2 & r_{2,1}^2 & 0 \\ 0 & r_{1,2}^2 & r_{1,1}^2 & 0 \\ r_{2,1}^1 & 0 & 0 & i \cdot r_{2,2}^1 \end{bmatrix}$$

and $$\tilde{\Gamma} = \frac{1}{\sqrt{5}} \begin{bmatrix} \alpha & \alpha\theta & 0 & 0 \\ \overline{\alpha} & \overline{\alpha}\overline{\theta} & 0 & 0 \\ 0 & 0 & \alpha & \alpha\theta \\ 0 & 0 & \overline{\alpha} & \overline{\alpha}\overline{\theta} \end{bmatrix} = \frac{1}{\sqrt{5}} \begin{bmatrix} C_{\alpha,\theta} & 0_{2\times 2} \\ 0_{2\times 2} & C_{\alpha,\theta} \end{bmatrix}$$

It will be noted that the matrix $\tilde{R}$ is an X matrix. We have also moved "i" from $\tilde{\Gamma}$ to $\tilde{R}$.

Some definitions and properties:

Definition 1: X matrix: a matrix will be said to be an X matrix if all the coefficients outside the diagonal and the antidiagonal are nonexistent.

Proposition 1:

The product of two X matrices is an X matrix.

Definition 2:

Let $(x^j)_{1 \leq j \leq 4}$ be four elements of the ring of algebraic integers $Z[i, \theta]$ (where $\theta$ is an algebraic integer such that $Q[i, \theta]$ is an algebraic extension of degree 2 of $Q[i]$) and $\alpha$ an element of $Z[i, \theta]$, a matrix $\Delta_\alpha(x^1, x^2, x^3, x^4)$ will be termed algebraic X if it is written:

$$\Delta_\alpha(x^1, x^2, x^3, x^4) = \begin{bmatrix} x^1 & 0 & 0 & \frac{\alpha}{\overline{\alpha}} \overline{x}^4 \\ 0 & \overline{x}^1 & \frac{\overline{\alpha}}{\alpha} \overline{x}^4 & 0 \\ 0 & \frac{\alpha}{\overline{\alpha}} \overline{x}^2 & \overline{x}^3 & 0 \\ \frac{\overline{\alpha}}{\alpha} x^2 & 0 & 0 & x^3 \end{bmatrix}$$

where $\overline{x}$ is the algebraic conjugate of x.

Proposition 2:

Let $\Delta_\alpha(x^1, x^2, x^3, x^4)$ be an algebraic X matrix, the determinant of $\Delta_\alpha(x^1, x^2, x^3, x^4)$ is given by:

$$\det(\Delta_\alpha(x^1,x^2,x^3,x^4)) = N_{Q[i,\theta]/Q[i]}(x^1 x^3 - x^2 x^4)$$

where $N_{Q[i,\theta]/Q[i]}(x) = x \cdot \overline{x}$ designates the algebraic norm of x (for x in $Q[i,\theta]$ relative to $Q[i]$. The determinant of $\Delta_\alpha(x^1, x^2, x^3, x^4)$ is an element of $Z[i]$ since it is the norm of the algebraic integer $x^1 x^3 - x^2 x^4$.

Proposition 3:

Let $\Delta_\alpha(x^1, x^2, x^3, x^4)$ be an algebraic X matrix, then there exists a unique matrix $\pi_\alpha(x^1, x^2, x^3, x^4)$ with coefficients in $Z[i]$ such that:

$$\Delta_\alpha(x^1, x^2, x^3, x^4) \cdot \begin{bmatrix} C_{\alpha,\theta} & 0_{2\times 2} \\ 0_{2\times 2} & C_{\alpha,\theta} \end{bmatrix} = \begin{bmatrix} C_{\alpha,\theta} & 0_{2\times 2} \\ 0_{2\times 2} & C_{\alpha,\theta} \end{bmatrix} \cdot \Pi_\alpha(x^1, x^2, x^3, x^4)$$

where $C_{\alpha,\theta} = \begin{bmatrix} \alpha & \alpha\theta \\ \overline{\alpha} & \overline{\alpha} \cdot \overline{\theta} \end{bmatrix}$ is the matrix of the canonical embedding of the ideal $aZ[i,\theta]$ in $Z[i]$ In the case of the Golden Code, the matrix $\pi_\alpha(x^1, x^2, x^3, x^4)$ is given by:

$$\Pi_\alpha(x^1, x^2, x^3, x^4) = \begin{bmatrix} x_1^1 & x_2^1 & x_1^4 & x_1^4 - x_2^4 \\ x_2^1 & x_1^1 + x_2^1 & x_2^4 & -x_1^4 \\ x_1^2 + x_2^2 & x_1^2 + 2 \cdot x_2^2 & x_1^3 + x_2^3 & -x_2^3 \\ -x_2^2 & -x_1^2 - x_2^2 & -x_2^3 & x_1^3 \end{bmatrix}$$

where $\forall j \ 1 \leq j \leq 4 \ x^j = x_1^j + \theta \cdot x_2^j$ ($x_1^j$ and $x_2^j \in Z[i]$)

Moreover, for the Golden Code, the matrix $$\frac{1}{\sqrt{5}} C_{\alpha,\theta}$$

is unitary.

Proposition 4:

Let $\Delta_\alpha(x^1, x^2, x^3, x^4)$ be an algebraic X matrix and $\pi_\alpha(x^1, x^2, x^3, x^4)$ its associated matrix, then $\pi_\alpha(x^1, x^2, x^3, x^4) \in GL_4(Z[i])$ if and only if:

$$|N_{Q[i,\theta]/Q[i]}((x^1 x^3 - x^2 x^4))| = 1.$$

Similarly, we can define diamond matrices (nonexistant coefficients on the diagonal and the antidiagonal) likely to obtain good results.

After permutation of Z, a basis reduction, 204 on FIG. 2, termed algebraic reduction is carried out in the following manner.

Let $\Delta_\alpha(x^1, x^2, x^3, x^4)$ be an algebraic X matrix with determinant of module 1 and $\pi_\alpha(x^1,x^2,x^3,x^4)$ its associated matrix. $\pi_\alpha(x^1,x^2, x^3, x^4)$ is an invertible matrix and its inverse has coefficients in $Z[i]$.

We therefore have:

$$\tilde{Z} = 2 \cdot K_M \tilde{R} \cdot \tilde{\Gamma} \cdot S + \tilde{W} = 2K_M \tilde{R} \cdot \Delta_\alpha(x^1,x^2,x^3,x^4) \cdot \tilde{\Gamma} \cdot \pi_\alpha^{-1}(x^1,x^2,x^3,x^4) \cdot S + \tilde{W}$$

$$\tilde{Z} = 2 \cdot K_M \cdot \tilde{\psi} \cdot \tilde{\Gamma} \cdot S' + \tilde{W}$$

By having put: $\tilde{\psi} = \tilde{R} \cdot \Delta_\alpha(x^1,x^2,x^3,x^4)$ and $S' = \pi_\alpha^{-1}(x^1,x^2,x^3,x^4) \cdot S$ The matrix $\tilde{\psi}$ is an X matrix as well as a product of an X matrix. A reduction has therefore been carried out using the passage matrix $\pi_\alpha(x^1,x^2,x^3,x^4)$ which has transformed the initial channel matrix $\tilde{R}$ into an equivalent channel matrix $\tilde{\psi}$.

The aim of the algebraic reduction is therefore to find a matrix $\Delta_\alpha(x^1, x^2, x^3, x^4)$ so that the matrix $\tilde{\psi}$ has improved properties to allow the use of a simple decoding technique while at the same time obtaining good performance. To do this, two criteria are defined: a balance within each layer and a maximization of the power of the second layer. These criteria will be described in more detail in the following.

The sought properties of $\tilde{\psi}$ therefore depend on the decoding algorithm employed.

The decoding by layer will now be described for a number of candidates: using the ZF-DFE algorithms, 205 on FIG. 2.

The decoding principle for p candidates is as follows.

The decoding algorithm consists of determining p possible candidates for layer 2. For each of the p layer 2 candidates, the closest value for layer 1 is determined, while reporting the decision made on layer 2 (as for the DFE method). Within each of the layers, the decoding technique is ZF made virtually optimal by algebraic reduction (step 2 of the reduction). The number of candidates, p, is a relatively low number: p=2 is, for example, an excellent compromise between complexity and performance. From the perspective of a real time system that is easy to implement, it is preferable to fix the value of p. However, more complex strategies for determining p, as a function of the matrix $\psi$ could be envisaged.

The QR Decomposition

Let us suppose that the reduction has already been carried out; we then have:

$$\tilde{Z} = 2K_M \cdot \tilde{\psi} \cdot \tilde{\Gamma} \cdot S' + \tilde{W}$$

A QR decomposition of the matrix $\tilde{\psi}$ is carried out:

$$\tilde{\Psi} = \begin{bmatrix} \Psi^1_{1,1} & 0 & 0 & i.\Psi^1_{1,2} \\ 0 & \Psi^2_{2,2} & \Psi^2_{2,1} & 0 \\ 0 & \Psi^2_{1,2} & \Psi^2_{1,1} & 0 \\ \Psi^1_{2,1} & 0 & 0 & i.\Psi^1_{2,2} \end{bmatrix} = U \cdot T$$

with U a unitary 4×4 complex matrix ($U^H U = I_4$) and T a upper triangular 4×4 complex matrix in which the diagonal terms are real and positive. In addition, U and T have a particular structure:

$$U = \begin{bmatrix} u_{1,1} & 0 & 0 & u_{1,4} \\ 0 & u_{2,2} & u_{2,3} & 0 \\ 0 & u_{3,2} & u_{3,3} & 0 \\ u_{4,1} & 0 & 0 & u_{4,4} \end{bmatrix} \text{ and } T = \begin{bmatrix} t_{1,1} & 0 & 0 & t_{1,4} \\ 0 & t_{2,2} & t_{2,3} & 0 \\ 0 & 0 & t_{3,3} & 0 \\ 0 & 0 & 0 & t_{4,4} \end{bmatrix}$$

Given the form of $\tilde{\psi}$, its QR decomposition is equivalent to the QR decomposition of 2 2×2 matrices:

$$\begin{bmatrix} \Psi^1_{1,1} & i.\Psi^1_{1,2} \\ \Psi^1_{2,1} & i.\Psi^1_{2,2} \end{bmatrix} = \begin{bmatrix} u_{1,1} & u_{1,4} \\ u_{4,1} & u_{4,4} \end{bmatrix} \cdot \begin{bmatrix} t_{1,1} & t_{1,4} \\ 0 & t_{4,4} \end{bmatrix}$$

$$\begin{bmatrix} \Psi^2_{2,2} & \Psi^2_{2,1} \\ \Psi^2_{1,2} & \Psi^2_{1,1} \end{bmatrix} = \begin{bmatrix} u_{2,2} & u_{2,3} \\ u_{3,2} & u_{3,3} \end{bmatrix} \cdot \begin{bmatrix} t_{2,2} & t_{2,3} \\ 0 & t_{3,3} \end{bmatrix}$$

We then have:

$$\tilde{Z} = 2K_M \cdot U \cdot T \cdot \tilde{\Gamma} \cdot S' + \tilde{W}$$

By multiplying by $U^H$, we obtain:

$$\tilde{Z}' = U^H \cdot \tilde{Z} = 2K_M T \cdot \tilde{\Gamma} \cdot S' + \tilde{W}'$$

with $E(\tilde{W}'\tilde{W}'^H) = N_0 \cdot I_4$ since U is unitary.

The extraction of p candidates by ZF for the second layer.

The last two components of $\tilde{Z}'$ are:

$$\begin{bmatrix} z'_3 \\ z'_4 \end{bmatrix} = 2 \cdot K_m \cdot \begin{bmatrix} t_{3,3} & 0 \\ 0 & t_{4,4} \end{bmatrix} \cdot \frac{1}{\sqrt{5}} C_{\alpha,\theta} \cdot \begin{bmatrix} s'_3 \\ s'_4 \end{bmatrix} + \begin{bmatrix} \tilde{w}'_3 \\ \tilde{w}'_4 \end{bmatrix}$$

By applying a ZF (by multiplying by the inverse matrix), we obtain:

$$\tilde{S}'_2 = \frac{1}{2 \cdot K_M \sqrt{5}} \cdot C^H_{\alpha,\theta} \cdot \begin{bmatrix} 1/t_{3,3} & 0 \\ 0 & 1/t_{4,4} \end{bmatrix} \begin{bmatrix} z'_3 \\ z'_4 \end{bmatrix}$$

From which:

$$\tilde{S}'_2 = \begin{bmatrix} s'_3 \\ s'_4 \end{bmatrix} + \frac{1}{2 \cdot K_M \sqrt{5}} \cdot C^H_{\alpha,\theta} \cdot \begin{bmatrix} 1/t_{3,3} & 0 \\ 0 & 1/t_{4,4} \end{bmatrix} \cdot \begin{bmatrix} \tilde{w}'_3 \\ \tilde{w}'_4 \end{bmatrix}$$

Starting from the vector $\tilde{S}'_2$, a list of distinct 2×2 $Z[i]^2$ p vectors is established $\{\hat{S}'_2{}^1, \ldots, \hat{S}'_2{}^p\}$ closest to $\tilde{S}'_2$.

The ZF decoding of the first layer after referring p candidates

For each of p vectors $\hat{S}'_2{}^j$ ($1 \leq j \leq p$), a vector $\hat{S}'_1{}^j$ is calculated by rounding each of the coordinates of $\tilde{S}'_1{}^j$ defined as follows:

$$\tilde{S}'^j_1 = \frac{1}{2 \cdot K_M \sqrt{5}} \cdot C^H_{\alpha,\theta} \cdot \begin{bmatrix} 1/t_{1,1} & 0 \\ 0 & 1/t_{2,2} \end{bmatrix} \cdot \left( \begin{bmatrix} z'_1 \\ z'_2 \end{bmatrix} - 2 \cdot K_M \cdot \begin{bmatrix} 0 & t_{1,4} \\ t_{2,3} & 0 \end{bmatrix} \cdot \frac{1}{\sqrt{5}} C_{\alpha,\theta} \cdot \hat{S}'^j_2 \right)$$

The vector $\hat{S}'^j$ is constructed:

$$\hat{S}'^j = \begin{bmatrix} \hat{S}'^j_1 \\ \hat{S}'^j_2 \end{bmatrix}$$

The vector $\hat{S}'^j$ is reduced in the initial base to obtain $\hat{S}^j$:

$$\hat{S}^j = \pi_\alpha(x^1, x^2, x^3, x^4) \cdot \hat{S}'^j$$

Thus a list of p distinct $\{\hat{S}^1, \ldots \hat{S}^p\}$ two by two $Z[i]^4$ candidate vectors to be the decoded vector $\hat{S}$ is prepared.

determination of the best candidate.

Each of the vectors $\hat{S}^j$, is tested for membership of the shaping region. In this way, we build a sub-list of the preceding list, while keeping only the vectors meeting the shaping condition. This list of k vectors (with $0 \leq k \leq p$) will be noted: $\{\hat{S}^{o(1)}, \ldots, \hat{S}^{o(k)}\}$. It is necessary to distinguish 2 cases:

k=0. Several strategies can be adopted without serious consequences on performance. For example, we can choose to saturate the coordinates of $\hat{S}'$ which do not meet the shaping condition, in order to obtain the decoded vectors $\hat{S}$.

$k \geq 1$. In this case, the decoded vector $\hat{S}$ is defined as follows:

$$\hat{S} = \text{Arg}\left(\min_{1 \leq j \leq k} \|\tilde{Z} - 2 \cdot K_M \tilde{R} \cdot \tilde{\Gamma} \cdot \hat{S}^{\sigma(j)}\|^2\right)$$

We will repeat below the criteria for $\tilde{\psi}$ during the reduction algorithm.

equilibrium within each layer.

For each of the layers, a ZF decoding will be used. For the layer j ($1 \leq j \leq 2$), the 2×2 matrix $A_j$ to be inverted is presented as follows:

$$A_j = 2 \cdot K_M \cdot \begin{bmatrix} t_{2 \cdot j-1, 2 \cdot j-1} & 0 \\ 0 & t_{2 \cdot j, 2 \cdot j} \end{bmatrix} \cdot \frac{1}{\sqrt{5}} C_{\alpha, \theta}$$

Given that the matrix $$\frac{1}{\sqrt{5}} C_{\alpha, \theta}$$

is unitary, if $t_{2,j-1, 2,j-1}$ and $t_{2,j,2,j}$ are equal, then the matrix $A_j$ is proportional to a unitary matrix, which would make the ZF decoding equivalent to Maximum Likelihood within each of the layers. The aim of the reduction within layer j is therefore to equalize as far as possible the coefficients $t_{2,j-1, 2,j-1}$ and $t_{2,j,2,j}$.

to maximize the power of layer 2.

In order that the proposed decoder has the came behaviour as Maximum Likelihood, it is necessary that, from the p points chosen during decoding the second layer, one of them corresponds to that which the Maximum Likelihood decoder has decoded. To do this, it is necessary to maximize the product $t_{3,3} \cdot t_{4,4}$.

Given that the reduction does not modify the determinant module of T (i.e. the product $t_{1,1} \cdot t_{2,2} \cdot t_{3,3} \cdot t_{4,4}$), maximizing the product $t_{3,3} \cdot t_{4,4}$ is equivalent to minimizing the product $t_{1,1} \cdot t_{2,2}$.

It is important to note that:

$$t_{1,1} = \|\Psi_1\| = \sqrt{\sum_{i=1}^{4} |\Psi_{i,1}|^2} \quad \text{et} \quad t_{2,2} = \|\Psi_2\| = \sqrt{\sum_{i=1}^{4} |\Psi_{i,2}|^2}$$

An example of a reduction algorithm will now be described, taking into account the two criteria of equilibrium and maximization.

Principle of the Reduction Algorithm:

The algebraic reduction algorithm is carried out in two steps:

The first step consists in determining a first quadruplet ($\beta^1$, $\beta^2$, $\beta^3$, $\beta^4$) of algebraic integers which will allow minimization of the product $\|\tilde{\phi}_1\| \cdot \|\tilde{\phi}_2\|$ where the matrix $\tilde{\phi}$ is given by:

$$\tilde{\phi} = \tilde{R} \cdot \Delta_\alpha(\beta^1, \beta^2, \beta^3, \beta^4)$$

The second step consists of balancing each of the layers once the first step is completed. This step does not modify the balance between the layers, i.e. we will have $$\|\tilde{\phi}_1\| \cdot \|\tilde{\phi}_2\| = \|\tilde{\psi}_1\| \cdot \|\tilde{\psi}_2\|$$

Preliminary Mathematics:

If we have: $\tilde{\phi} = \tilde{R} \cdot \Delta_\alpha(\beta^1, \beta^2, \beta^3, \beta^4)$ It will be noted that for a given matrix $\tilde{R}$:

$\|\tilde{\phi}_1\|$ depends only on ($\beta^1, \beta^2$) which will be denoted $\|\tilde{\phi}_1\|$ ($\beta^1, \beta^2$):

$$\|\tilde{\Phi}_1\|(\beta^1, \beta^2) = \sqrt{\left|r_{1,1}^1 \cdot \beta^1 + i.r_{1,2}^1 \frac{\alpha}{\alpha} \beta^2\right|^2 + \left|r_{2,1}^1 \cdot \beta^1 + i.r_{2,2}^1 \frac{\alpha}{\alpha} \beta^2\right|^2}$$

$\|\tilde{\phi}_2\|$ depends only on ($\overline{\beta}^1, \overline{\beta}^2$):

$$\|\tilde{\Phi}_2\|(\overline{\beta}^1, \overline{\beta}^2) = \sqrt{\left|r_{2,2}^2 \cdot \overline{\beta}^1 + r_{2,1}^2 \frac{\alpha}{\alpha} \overline{\beta}^2\right|^2 + \left|r_{1,2}^2 \cdot \overline{\beta}^1 + r_{1,1}^2 \frac{\alpha}{\alpha} \overline{\beta}^2\right|^2}$$

Definition:

A unit of a number field $Q[i,\theta]$ is an element of $Z[i,\theta]$ the inverse of which is also in $Z[i,\theta]$. Any unit of $Q[i,\theta]$ has an algebraic norm relative to a $Q[i]$ which belongs to $\{1, -1, i, -i\}$.

Dirichlet's Theorem in a Real Quadratic Field:

Let $Q[\theta]$ be a totally real algebraic extension of Q of degree 2. Then a unit exists, called fundamental unit $\mu$, such that any unit u of $Q[\theta]$ can be written: $u = (\pm 1) \cdot \mu^k$ with $k \in Z$ Comment:

In the case of the Golden Code, we can take $\mu = \theta$

Proposition 5:

If the pair ($\beta^1, \beta^2$) of algebraic integers from $Z[i,\theta]$ minimises the product $\|\tilde{\phi}_1\| \cdot \|\tilde{\phi}_2\|$, then $\beta^1$ and $\beta^2$ have no common multiples other than units of $Z[i,\theta]$.

Proof:

Let us suppose that ($\beta^1, \beta^2$) minimises $\|\tilde{\phi}_1\| \cdot \|\tilde{\phi}_2\|$ and that $x \in Z[i,\theta]$ exist such that $\beta^1 = x \cdot \gamma^1$ et $\beta^2 = x \cdot \gamma^2$. Then $$\|\tilde{\phi}_1\|(\beta^1, \beta^2) \cdot \|\tilde{\phi}_2\|(\overline{\beta}^1, \overline{\beta}^2) = |N_{Q[i,\theta]/Q[i]}(x)| \|\tilde{\phi}_1\|(\gamma^1, \gamma^2) \cdot \|\tilde{\phi}_2\|(\overline{\gamma}^1, \overline{\gamma}^2)$$

from which $|N_{Q[i,\theta]/Q[i]}(x)| = 1$.

Therefore x is a unit of $Z[i,\theta]$.

Proposition 6:

If the ring of algebraic integers $Z[i,\theta]$ is a PID (Principal Integral Domain), which is the case for the Golden Code, and if in addition $\beta^1$ and $\beta^2$ are two algebraic integers of $Z[i,\theta]$, which have no common multiples other than units of $Z[i,\theta]$, then two algebraic integers $\beta^3$ and $\beta^4$ exist such that:

$$\beta^1 \cdot \beta^3 - \beta^2 \cdot \beta^4 = 1$$

Proof:

From proposal 5, we use a generalisation of Bézout's theorem in a PID, or even in particular the document: H. Cohen, "A Course in Computational Algebraic Number Theory", Springer, 1996.

Proposition 7:

If the pair ($\beta^1, \beta^2$) of algebraic integers of $Z[i,\theta]$ minimises the product $\|\tilde{\phi}_1\| \cdot \|\tilde{\phi}_2\|$ and if, in addition $Z[i,\theta]$ is a PID, then there are two algebraic integers $\beta^3$ and $\beta^4$ of $Z[i,\theta]$ (which are determined by resolving $\beta^1 \cdot \beta^3 - \beta^2 \cdot \beta^4 = 1$) such that $\pi_\alpha(\beta^1, \beta^2, \beta^3, \beta^4) \in GL_4(Z[i])$ Proposition 8:

Let $\mu$ be a fundamental unit of $Z[i,\theta]$ with $|\mu| > 1$. Let ($\gamma^1, \gamma^2$) $\in Z[i,\theta]^2$, then ($\beta^1, \beta^2$) $\in Z[i,\theta]^2$ exists such that:

$$\|\tilde{\Phi}_1\|(\beta^1, \beta^2) \cdot \|\tilde{\Phi}_2\|(\overline{\beta}^1, \overline{\beta}^2) = \|\tilde{\Phi}_1\|(Y^1, Y^2) \cdot \|\tilde{\Phi}_2\|(\overline{Y}^1, \overline{Y}^2)$$

-continued and $$\|\Phi_1\|^2(\beta^1, \beta^2) + \|\Phi_2\|^2(\overline{\beta}^1, \overline{\beta}^2) \leq \|\Phi_1\|(\beta^1, \beta^2) \cdot \|\Phi_2\|(\overline{\beta}^1, \overline{\beta}^2) \cdot \left(|\mu| + \frac{1}{|\mu|}\right)$$

Proof:

Let $k = \left\lfloor \frac{\ln(\|\Phi_1\|(Y^1, Y^2)) - \ln(\|\Phi_2\|(\overline{Y}^1, \overline{Y}^2))}{\ln(|\mu|^2)} + 0.5 \right\rfloor$.

We take:

$\beta^1 = \mu^{-k} Y^1 \, et \, \beta^2 = \mu^{-k} Y^2$

Then we have $\|\Phi_1\|(\beta^1, \beta^2) \cdot \|\Phi_2\|(\overline{\beta}^1, \overline{\beta}^2) = \|\Phi_1\|(Y^1, Y^2) \cdot \|\Phi_2\|(\overline{Y}^1, \overline{Y}^2)$ and $\frac{\text{Max}(\|\Phi_1\|(\beta^1, \beta^2), \|\Phi_2\|(\overline{\beta}^1, \overline{\beta}^2))}{\text{Min}(\|\Phi_1\|(\beta^1, \beta^2), \|\Phi_2\|(\overline{\beta}^1, \overline{\beta}^2))} \leq |\mu|$ We then easily obtain:

$$\|\Phi_1\|^2(\beta^1, \beta^2) + \|\Phi_2\|^2(\overline{\beta}^1, \overline{\beta}^2) \leq \|\Phi_1\|(\beta^1, \beta^2) \cdot \|\Phi_2\|(\overline{\beta}^1, \overline{\beta}^2) \cdot \left(|\mu| + \frac{1}{|\mu|}\right)$$

First step: balance between layers:
Search for $(\beta^1, \beta^2) \in Z[i, \theta]^2$ First of all, we search for the pair $(\beta^1, \beta^2) \in Z[i, \theta]^2$ which minimizes $\|\tilde{\phi}_1\| \cdot \|\tilde{\phi}_2\|$.

The determination of $(\beta^1, \beta^2) \in Z[i, \theta]^2$ is equivalent to the determination of the vector B of $Z[i]^4$ defined by:

$$B = \begin{bmatrix} \beta_1^1 \\ \beta_2^1 \\ \beta_1^2 \\ \beta_2^2 \end{bmatrix} \text{ where } \beta^j = \beta_1^j + \theta \cdot \beta_2^j$$

By setting:

$$\Omega = \begin{bmatrix} \omega_1 \\ \omega_2 \\ \omega_3 \\ \omega_4 \end{bmatrix}$$

$$= \underbrace{\begin{bmatrix} r_{1,1}^1 & 0 & i \cdot r_{1,2}^1 & 0 \\ r_{2,1}^1 & 0 & i \cdot r_{2,2}^1 & 0 \\ 0 & r_{2,2}^2 & 0 & r_{2,1}^2 \\ 0 & r_{1,2}^2 & 0 & r_{1,1}^2 \end{bmatrix}}_{G_{\alpha,\theta}(R)} \begin{bmatrix} 1 & \theta & 0 & 0 \\ 1 & \overline{\theta} & 0 & 0 \\ 0 & 0 & \frac{\alpha}{\overline{\alpha}} & \frac{\alpha}{\overline{\alpha}} \theta \\ 0 & 0 & \frac{\alpha}{\overline{\alpha}} & \frac{\alpha}{\overline{\alpha}} \overline{\theta} \end{bmatrix} \cdot \begin{bmatrix} \beta_1^1 \\ \beta_2^1 \\ \beta_1^2 \\ \beta_2^2 \end{bmatrix}$$

$= G_{\alpha,\theta}(R) \cdot B$

We therefore have:

$\|\tilde{\phi}_1\|^2 = |\omega_1|^2 + \omega_2|^2$ $\|\tilde{\phi}_2\|^2 = |\omega_3|^2 + \omega_4|^2$ The search algorithm runs as follows:
Initialization:
Search for the shortest vector of the lattice generated by the columns of $G_{\alpha,\theta}(R)$. $B_{min}$ is initialized by the coordinates of one of the shortest vectors of this lattice:

$$B_{min} \leftarrow \text{Arg}\left( \underset{\substack{B \in Z[i]^4 \\ B \neq 0}}{\text{Min}} \|G_{\alpha,\theta}(R) \cdot B\|^2 \right)$$

The value of $\|\tilde{\phi}_1\| \cdot \|\tilde{\phi}_2\|$ is calculated for $B_{min}$ this value is annotated $\rho$.
Search in a List:
We prepare the list, annotated L, of the vectors of the lattice generated by the columns of $G_{\alpha,\theta}(R)$ which have a square norm less than or equal to $\rho \cdot \left(|\mu| + \frac{1}{|\mu|}\right)$ i.e.:

$$L = \left\{ B \in Z[i]^4 B \neq 0 \text{ such that } \|G_{\alpha,\theta}(R) \cdot B\|^2 \leq \rho\left(|\mu| + \frac{1}{|\mu|}\right) \right\}$$

For each of the elements of the list, we calculate the value of $\|\tilde{\phi}_1\| \cdot \|\tilde{\phi}_2\|$, $B_{min}$ is the element of this list which minimises $\|\tilde{\phi}_1\| \cdot \|\tilde{\phi}_2\|$.

Using Proposition 8, it is evident that the pair $(\beta^1, \beta^2) \in Z[i, \theta]^2$ obtained using $B_{min}$ minimises the product $\|\tilde{\phi}_1\| \cdot \|\tilde{\phi}_2\|$.

determination of $(\beta^3, \beta^4) \in Z[i, \theta]^2$:

After having determined the pair $(\beta^1, \beta^2) \in Z[i, \theta]^2$ which minimises the product $\|\tilde{\phi}_1\| \cdot \|\tilde{\phi}_2\|$, it suffices to resolve the equation $\beta^1 \cdot \beta^3 - \beta^2 \cdot \beta^4 = 1$, which has a solution according Proposition 7, in order to determine the pair $(\beta^3, \beta^4) \, Z[i, \theta]^2$. Such an equation is reduced to a system of 4 equations with 8 unknowns with coefficients in Z, in which solutions are sought in $Z^8$. This type of system is easily resolved by putting a rectangular matrix with integer coefficients in HNF form (see H Cohen).

Second step: balance within the layers:
On completion of the first step, we have:

$\tilde{\phi} = \tilde{R} \cdot \Delta_\alpha(\beta^1, \beta^2, \beta^3, \beta^4)$ A QR decomposition of $\tilde{\phi}$ is carried out:

$\tilde{\phi} = U \cdot T$

For each layer j $(1 \leq j \leq 2)$, we define:

$k_j = \left\lfloor \frac{\ln(t_{2 \cdot j, 2 \cdot j}) - \ln(t_{2 \cdot j+1, 2 \cdot j+1})}{\ln(|\mu|^2)} + 0.5 \right\rfloor$ In this second step, we will use the reduction matrix $\Delta_\alpha(\mu^{-k_1}, 0, \mu^{-k_2}, 0)$ It will be noted that its associated matrix $\pi_\alpha(\mu^{-k_1}, 0, \mu^{-k_2}, 0)$ is certainly in $GL_4(Z[i])$ thanks to Proposition 4 and to the fact that $\mu^{-k_1-k_2}$ is a unit and therefore $|N_{Q[i,\theta]/Q[i]}(\mu^{-k_1-k_2})| = 1$ Conclusion of the reduction algorithm.

In conclusion, we define:

$$\tilde{\psi} = \tilde{R} \cdot \Delta_\alpha(\beta^1, \beta^2, \beta^3, \beta^4) \cdot \Delta_\alpha(\mu^{-k_1}, 0, \mu^{-k_2}, 0) = \tilde{R} \Delta_\alpha(x^1, x^2, x^3, x^4)$$

with $x^1 = \beta^1 \cdot \mu^{-k_1}$, $x^2 = \beta^2 \cdot \mu^{-k_1}$, $x^3 = \beta^3 \cdot \mu^{-k_2}$ and $x^4 = \beta^4 \cdot \mu^{-k_2}$ The curve on the single FIGURE has the decoder performances for two values of p (p=1 and p=2) compared with those of the Maximum Likelihood decoder and those of the MMSE-GDFE LLL ZF-DFE decoder. The performances are expressed in PER (Packet Error Rate), depending in the Signal to Noise Ratio (SNR) in dB.

Of course, the invention is not limited to the examples which have just been described and numerous adjustments can be made to these examples without exceeding the scope of the invention. The use of diamond matrices instead of X matrices can be envisaged for basis reduction and for decoding. Furthermore, the first step of the algebraic reduction algorithm may also not be carried out or it can be modified to make it easier to execute. However, to compensate for this drop in quality of the reduction, it will be necessary to take a fairly high value of p.

The invention claimed is:

1. A method for decoding 2×2 space-time codes of a vector Y, in particular of the Golden Code type, the decoding method comprising a decoder for performing the following steps:
  - a filtering of the minimum mean square error-generalized decision feedback equalizer (MMSE-GDFE) type is carried out by the decoder in order to obtain a vector $Y^F = RX + W$, with $Y^F$ the vector Y filtered by means of a filter matrix F ("forward filter"), R a conventional matrix named "backward filter", X the vector transmitted and W the complex noise matrix;
  - a constellation recentring is carried out by the decoder so that the vector to be determined becomes Z, such that $Z = Y^F - 2K_M R \Gamma S_0 = 2K_M R \Gamma S + W$, $K_M$ being the normalization constant for the constellation in question, F being the Golden Code, and S the vector of the information symbols;
  - a step of permutation of the elements of the matrices Z, R and F is carried out by the decoder in order to obtain $\tilde{Z}$, $\tilde{R}$ and $\tilde{\Gamma}$ such that $\tilde{R}^H \tilde{R}$ is a matrix in the form of an X and the complex number "i" is moved from Γ to R;
  - a step of lattice basis reduction is carried out by the decoder such that $\tilde{Z} = 2K_M \tilde{\Psi} \Gamma S' + W$ with $\tilde{\Psi} = \tilde{R} \cdot \Delta_\alpha(x^1, x^2, x^3, x^4)$ and $S' = \pi_\alpha^{-1}(x^1, x^2, x^3, x^4) \cdot S$, $\pi_\alpha(x^1, x^2, x^3, x^4)$ being a basis change matrix, $\pi_\alpha(x^1, x^2, x^3, x^4)$ is the matrix associated with $\Delta_\alpha(x^1, x^2, x^3, x^4)$ which is a matrix in which the determinant module is equal to 1 and defined such that $\Delta_\alpha^H \Delta_\alpha$ is a matrix in the form of an X; and
  - the zero forcing-decision feedback equalizer (ZF-DFE) decoding algorithm is applied by the decoder, in which among the four elements of two layers are identified, each layer comprising the two elements of the diagonal or anti-diagonal of $\tilde{Z}$; the DFE algorithm is applied layer by layer and the ZF algorithm within each of the layers.

2. The method according to claim 1, characterized in that the permutation of $\tilde{Z}$ is as follows:

$$\tilde{Z} = \begin{bmatrix} z_{1,1} \\ z_{2,2} \\ z_{1,2} \\ z_{2,1} \end{bmatrix}$$

with the following convention $$Z = \begin{bmatrix} z_{1,1} \\ z_{2,1} \\ z_{1,2} \\ z_{2,2} \end{bmatrix}.$$

3. The method according to claim 2, characterized in that $\tilde{R}$ is a matrix in the form of an X such that:

$$\tilde{R} = \begin{bmatrix} r_{1,1}^1 & 0 & 0 & i \cdot r_{1,2}^1 \\ 0 & r_{2,2}^2 & r_{2,1}^2 & 0 \\ 0 & r_{1,2}^2 & r_{1,1}^2 & 0 \\ r_{2,1}^1 & 0 & 0 & i \cdot r_{2,2}^1 \end{bmatrix} \text{ and } \tilde{\Gamma} = \frac{1}{\sqrt{5}} \begin{bmatrix} \alpha & \alpha\theta & 0 & 0 \\ \overline{\alpha} & \overline{\alpha}\overline{\theta} & 0 & 0 \\ 0 & 0 & \alpha & \alpha\theta \\ 0 & 0 & \overline{\alpha} & \overline{\alpha}\overline{\theta} \end{bmatrix},$$

α and θ being the Golden Code coefficients such that:

$$\theta = \frac{1+\sqrt{5}}{2}, \overline{\theta} = \frac{1-\sqrt{5}}{2},$$

$\alpha = 1+i-i\cdot\theta$, $\overline{\alpha} = 1+i-i\cdot\overline{\theta}$.

4. The method according to claim 1 wherein:

$$\Delta_\alpha(x^1, x^2, x^3, x^4) = \begin{bmatrix} x^1 & 0 & 0 & \frac{\alpha}{\overline{\alpha}} x^4 \\ 0 & \overline{x}^1 & \frac{\overline{\alpha}}{\alpha} x^4 & 0 \\ 0 & \frac{\alpha}{\overline{\alpha}} x^2 & \overline{x}^3 & 0 \\ \frac{\overline{\alpha}}{\alpha} x^2 & 0 & 0 & x^3 \end{bmatrix}$$

and $$\Pi_\alpha(x^1, x^2, x^3, x^4) = \begin{bmatrix} x_1^1 & x_2^1 & x_1^4 & x_1^4 - x_2^4 \\ x_2^1 & x_1^1 + x_2^1 & x_2^4 & -x_1^4 \\ x_1^2 + x_2^2 & x_1^2 + 2 \cdot x_2^2 & x_1^3 + x_2^3 & -x_2^3 \\ -x_2^2 & -x_1^2 - x_2^2 & -x_2^3 & x_1^3 \end{bmatrix}$$

where $\forall j\ 1 \leq j \leq 4\ x^i = x_1^j + \theta \cdot x_2^j$ ($x_1^j$ et $x_2^j \in Z[i]$).

5. The method according to claim 1, characterized in that $\Delta_\alpha$ is determined such that, during a QR decomposition, both elements of a single layer are substantially of the same value.

6. The method according to claim 1, characterized in that $\tilde{Z}$ is defined as two layers, a first layer consisting of elements on the diagonal and a second layer consisting of elements on the anti-diagonal, and in that $\Delta_\alpha$ is determined such that, during a QR decomposition, the product of the two elements of the second layer is greater than the product of the two elements of the first layer.

7. The method according to claim 1, characterized in that $\tilde{Z}$ is defined as two layers, a first layer composed of elements on the diagonal and a second layer composed of elements on the anti-diagonal, and in that during application of the ZF algorithm for the second layer, p possible candidates are extracted, then for the first layer p possible candidates are also extracted and then the best candidate vector is determined.

8. The method according to claim 7, characterized in that p is equal to 2.

9. The method according to claim 1, characterized in that $\tilde{R}$ and $\Delta_\alpha$ are X matrices.

10. The method according to claim 1, characterized in that $\tilde{R}$ and $\Delta_\alpha$ are diagonal matrices.

* * * * *